Jan. 7, 1969     W. B. DAVIS     3,420,635

FRUIT RIPENESS TELLTALE

Filed March 28, 1966

INVENTOR.
WARD BENJAMIN DAVIS
BY

ATTORNEY

United States Patent Office 3,420,635
Patented Jan. 7, 1969

3,420,635
FRUIT RIPENESS TELLTALE
Ward Benjamin Davis, Glendale, Calif., assignor to Aseptic Thermo Indicator Company, North Hollywood, Calif., a corporation of California
Filed Mar. 28, 1966, Ser. No. 537,726
U.S. Cl. 23—253                               9 Claims
Int. Cl. G01n *33/02;* G01n *33/22*

This invention relates to a telltale indicator to show visually when certain kinds of picked fruit have ripened and become edible.

The telltale of this invention is particularly applicable to those fruits which after picking have a climacteric rise in respiration at the end of the maturation cycle, and just before the edibly ripe state, namely avocados, bananas, mangoes, passion fruit, melons and the like.

It is the principal object of this invention to provide a telltale device which may be attached to an individual fruit, which by a distinct color change tells when the fruit is at the edible state. Some fruit of the class described does not have a natural distinctive change in coloring to indicate ripeness, for example avocados, and for such fruit the common test is that of a certain degree of softness of the flesh. But this commonly applied test causes bruising and injury which results in loss because the fruit is often rendered unsaleable. The use of the telltale of this invention provides a visual means for determining when each fruit is ripe, or is about to become ripe and edible.

Figure 1:
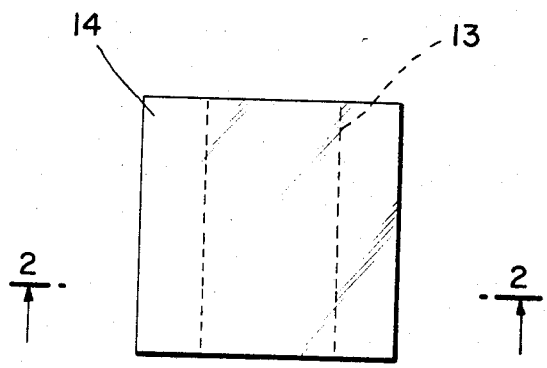
Figure 2:
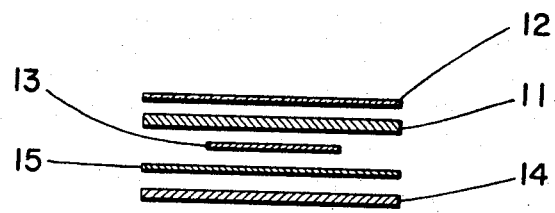

These objects are attained by my invention which will be understood from the following description of a preferred fom of the invention, reference being made to the accompanying drawing in which FIG. 1 is a plan view of one form of the invention; and FIG. 2 is an expanded cross-sectional view taken on the line 2—2.

In a preferred form of the invention, a base 11 of sheet plastic which may be a polyester material such as "Mylar" or the like, and shown as a rectangular tab, is provided on its back face (which in use is adjacent the fruit surface) with a pressure sensitive adhesive 12 which holds the telltale in contact with the skin of the fruit. A complete covering, or a stripe, or other shaped mark 13 of special color-changing composition (which will be described below), is printed or otherwise applied in a thin layer to the front surface of the base film 11. The mark is then covered after the composition has dried, with a piece of transparent film 14 having an adhesive coating 15, the adhesive also contacting the margins of the base 11 and thus holding the "sandwich" together. When this telltale is applied to the picked but unripe fruit, it will, in due time, change color, and takes on a distinct color at the time that the fruit is completely ripe or edible, or is approaching this state, the actual colors depending upon the acid-alkali or pH indicator chemical which is selected for use.

The special color-changing composition consists essentially of an acid-base indicator chemical in alkaline form (sometimes called a pH indicator), and a solid adsorbent for carbon dioxide in a selected quantity per surface unit which is less than the quantity which will absorb all of the carbon dioxide liberated by the surface of the fruit which is in contact with the telltale during the period of climacteric respiration. The carbon dioxide absorbent is preferably calcium hydroxide. It is convenient to regulate the amount of calcium hydroxide available over a given area of the fruit by applying it in the form of a paint or ink, whose viscosity as well as the manner of application together determine the thickness of the dried film of ink or paint and therefore the amount of carbon dioxide absorbent available from a selected area of the fruit, i.e. the area covered by the telltale. When the available absorbent has taken up its full amount of carbon dioxide evolved by the fruit during the ripening process, then the excess carbon dioxide acts as an acid to produce a change of color in the pH indicator compound which has been mixed with the calcium hydroxide. The color change shows when the fruit is ripe, or when the fruit is approaching the state of ripeness.

The preferred acid-base or pH indicator compound is the water soluble form of "Cresol Red" (from Matheson, Coleman & Bell) which at pH 2.0 is orange in color; at pH 3.0 is amber in color; at pH 7.2 is yellow in color; and at 8.8 pH is purple in color. The changing of the color from the original alkali (or high pH) purple color, to the yellow, amber, or orange color, clearly shows when an excess of carbon dioxide has been absorbed by the ink, and therefore when the fruit is edible.

Other acid-alkali indicators may also be used, such as "Phenol Red" (Matheson, Coleman & Bell), and similar pH indicators having a distinctive alkali color.

It has been found that a small proportion of hydrated calcium chloride ($CaCl_2 \cdot 2H_2O$) in the calcium hydroxide absorbent, makes it more active, perhaps because the presence of the hygroscopic calcium chloride insures the presence of a small amount of moisture, and facilitates the absorption of the carbon dioxide gas.

A typical color-changing composition consists of

| | Parts by weight |
|---|---|
| Calcium hydroxide (anhydrous) | 41 |
| Calcium chloride ($CaCl_2 \cdot 2H_2O$) | 1 |
| Ethyl Cellulose ("Ethocel"—Dow Chemical Co.) | 13.7 |
| Water | 15 |
| Acid-alkali indicator ("Cresol Red") | .4 |

While the above color-changing composition may be used in a suitably thin layer, it is desirable to apply it to the base film 11 as a suspension in a carrier liquid which is particularly adapted for use by the usual flexographic printing technique. For this purpose, the above composition was suspended in a typical carrier solvent consisting of the following ingredients in the proportions indicated:

| | Parts by weight |
|---|---|
| Hydrocarbon solvent (Standard Oil of Calif. "Social" #1) aromatic, gravity 38, B.P. 216–292° F. | 114 |
| Ethanol solvent (Shell Oil Co. "Filmcol") | 30 |
| Glycol ether ("Ethyl Cellosolve"-Union Carbide Co.) | 36 |
| Glycerine | 3.5 |

For each 71.5 parts by weight of color changing composition, 150 to 184 parts by weight of the solvent may be used.

It will be understood that many variations in the composition of the ink may be made without departing from the essential part of the invention which is to provide a layer or film of a mixture of carbon dioxide absorbent of known capacity to absorb carbon dioxide, and a pH indicator compound, on a base film which makes contact with the surface of the fruit. The thickness of the ink mark 13 may be from 0.1 to 1 mil in thickness without reducing the sensitivity of the telltale.

The thickness of base film 11 and the cover film 14 appear to control to some degree the diffusion of the carbon dioxide released by the fruit into the color changing compound, but it does not appear to be very critical. When "Mylar" or "Scotch par" film is used, a thickness of 0.5 mil is preferred.

The preferred compositions and dimensions given above are particularly applicable to a telltale for avocados.

The color changing composition, or the composition suspended in a carrier liquid, may be applied directly to the fruit surface, but the indication of ripeness is less dependable and not so accurate because the mark is unprotected mechanically, and is subject to variations from external chemical effects.

For other varieties of fruit, variations may be made to get better sensitivity for each particular variety.

The advantages of the invention will be obvious from the above description.

I claim:

1. A telltale device for determining when picked fruit of the variety having a climacteric rise in respiration of carbon dioxide as the fruit approaches the state of ripeness, has become edible, comprising a thin layer of a mixture of a carbon dioxide absorbent and a pH color changing indicator, adapted to be applied in communication with the surface of a fruit, the amount of said absorbent on the covered area being less than that required to absorb the carbon dioxide evolved at ripeness at the surface of the fruit subtended by said layer of absorbent, and said pH indicator being adapted to change color when an excess of carbon dioxide is evolved at the fruit area subtended by said layer.

2. The telltale device defined in claim 1, in which the carbon dioxide absorbent comprises calcium hydroxide.

3. The telltale device defined in claim 1 in which a film permeable to carbon dioxide gas is provided on the layer of absorbent adapted to be in contact with said fruit surface.

4. The telltale device defined in claim 3, in which a pressure sensitive adhesive layer is provided on said permeable film on the surface adapted to be in contact with said fruit surface.

5. The telltale device defined in claim 4 in which the carbon dioxide absorbent layer including the pH indicator is applied to said carbon dioxide permeable film by printing.

6. The telltale device defined in claim 4 in which the absorbent layer is covered by a transparent gas permeable film, said film being attached by an adhesive coating thereon.

7. In combination, the telltale device defined in claim 1, in communication with the surface of an avocado.

8. An indicator ink for use in a telltale to determine when picked fruit of the kind having a climacteric rise in respiration of carbon dioxide as the fruit approaches ripeness, comprising a mixture of carbon dioxide absorbent and a pH color-changing indicator chemical, and a liquid carrier for said mixture, said liquid carrier comprising a flexographic printing ink.

9. The indicator ink defined in claim 8, in which the absorbent mixture contains a small proportion of calcium chloride hydrate.

References Cited

UNITED STATES PATENTS

| | | | |
|---|---|---|---|
| 1,328,188 | 1/1920 | Ohashi | 106—22 |
| 2,063,245 | 12/1936 | Haeseler | 23—232 |
| 2,918,033 | 12/1959 | Snyder | 23—253 |
| 2,991,184 | 7/1961 | Bernardi et al. | 106—22 |

OTHER REFERENCES

Biale, J. B., et al.: Endeavour 21, 164–174 (1962) October.

MORRIS O. WOLK, *Primary Examiner.*

R. M. REESE, *Assistant Examiner.*

U.S. Cl. X.R.

99—100, 103, 154, 240; 106—21, 22, 23; 116—114